United States Patent
Schmidt et al.

[11] Patent Number: 5,823,501
[45] Date of Patent: Oct. 20, 1998

[54] VEHICULAR MIRROR MOUNTING ASSEMBLY

[76] Inventors: William P. Schmidt, 2100 Woodruff, Rockwood, Mich. 48173; Franklin D. Hutchinson, 28000 Bell Rd., New Boston, Mich. 48164

[21] Appl. No.: 81,971

[22] Filed: Jun. 23, 1993

Related U.S. Application Data

[63] Continuation-in-part of Ser. No. 843,508, Feb. 28, 1992, Pat. No. 5,301,916, which is a continuation-in-part of Ser. No. 419,213, Oct. 10, 1989, Pat. No. 5,106,049.

[51] Int. Cl.$^6$ .................................................. A47F 7/14
[52] U.S. Cl. ................................. 248/475.1; 359/844
[58] Field of Search ................................. 248/487, 476, 248/475.1, 74.2, 74.3, 231, 316.5, 539, 540, 541; 24/543, 487; 359/844, 871, 872, 874; 211/94, 89

[56] References Cited

U.S. PATENT DOCUMENTS

| | | |
|---|---|---|
| 1,905,623 | 4/1933 | Dietz . |
| 2,294,986 | 9/1942 | Hynek ........................ 248/539 |
| 3,266,761 | 8/1966 | Walton et al. ................ 248/74.3 |
| 3,491,971 | 1/1970 | Fisher ....................... 248/74.2 X |
| 3,667,718 | 6/1972 | Goslin et al. . |
| 3,729,163 | 4/1973 | Cummins . |
| 3,778,016 | 12/1973 | Gernhardt et al. . |
| 3,802,655 | 4/1974 | Schuplin ..................... 248/74.3 X |
| 3,807,675 | 4/1974 | Seckerson et al. .......... 248/316.7 X |
| 3,833,198 | 9/1974 | Holzman . |
| 3,857,539 | 12/1974 | Kavanaugh . |
| 3,906,592 | 9/1975 | Sakasegawa et al. . |
| 3,976,275 | 8/1976 | Clark . |
| 4,030,692 | 6/1977 | Szilagyi . |
| 4,212,303 | 7/1980 | Nolan . |
| 4,368,868 | 1/1983 | Urban . |
| 4,500,063 | 2/1985 | Schmidt et al. . |
| 4,518,191 | 5/1985 | Williams et al. .............. 248/298 X |
| 4,609,171 | 9/1986 | Matsui . |
| 4,830,326 | 5/1989 | Schmidt et al. . |
| 4,880,133 | 11/1989 | Cullinane ..................... 248/229 X |
| 5,005,963 | 4/1991 | Schmidt et al. . |
| 5,106,049 | 4/1992 | Schmidt et al. . |

Primary Examiner—Ramon O. Ramirez
Attorney, Agent, or Firm—Weintraub & Brady

[57] ABSTRACT

A mirror mounting assembly is attachable to a wing-window portion of a vehicular door. The assembly has at least one mirror mounted on a support. The assembly additionally has a bracket which fits into the wing-window portion of a vehicular door. The bracket has a base member to which the support is secured and a clamping plate, which secures the assembly within the window. The base has a first member and second member hingedly connected. These members may then be opened and closed around the support. By this, the assembly is formed for deployment in a wing-window.

10 Claims, 2 Drawing Sheets

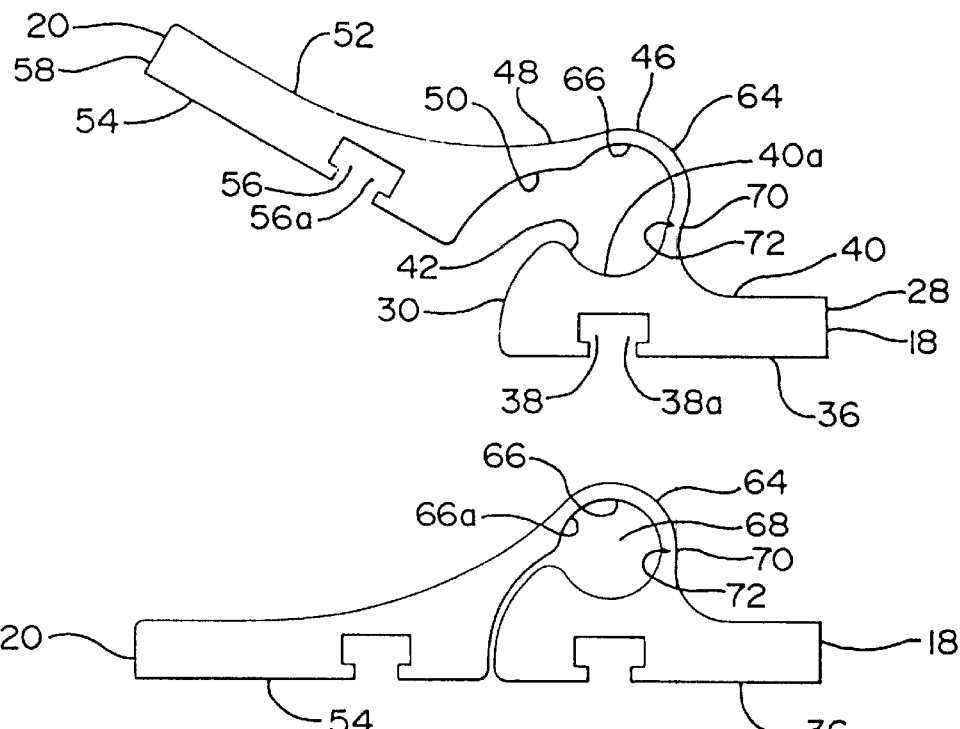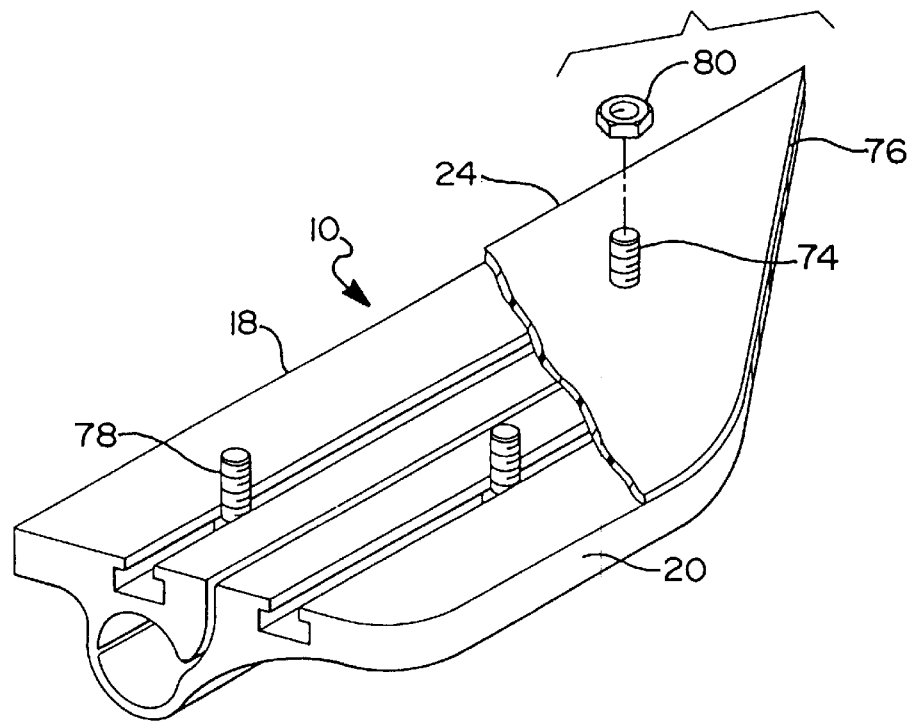

VEHICULAR MIRROR MOUNTING ASSEMBLY

CROSS-REFERENCE TO RELATED APPLICATIONS

This application is a continuation-in-part application of U.S. patent application Ser. No. 07/843,508, filed Feb. 28, 1992, now U.S. Pat. No. 5,301,916 which is a continuation-in-part of U.S. patent application Ser. No. 07/419,213 filed Oct. 10, 1989, which issued as U.S. Pat. No. 5,106,049, the disclosures of both of these applications are incorporated herein by reference.

BACKGROUND OF INVENTION

1. Field of Invention

This invention relates to mirror mounting brackets for vehicles. More specifically, the present invention concerns vehicular side door mounting brackets.

2. Brief Description of Prior Art

Exteriorly vehicular mounted mirrors are well known. Traditionally, mirrors are exteriorly mounted to the vehicles on the doors, fenders or, in some cases, on the roof. A typical example of a front fender mirror mounting bracket is found in U.S. Pat. No. 4,500,063, issued Feb. 19, 1985 to Schmidt et alia and entitled "FENDER MOUNT FOR A MIRROR". Schmidt et al teaches a front fender mirror mounting bracket that fits the curved portion of the fender at the intersection of its top and side portions. The bracket of Schmidt is a two-piece mounting bracket having a base, designed to fit the fender and a cover, which is fastened over and, with the base, clamps a tubular support which supports a mirror.

One example of a door mounted mirror is found in U.S. Pat. No. 4,830,326, issued May 16, 1989 to Schmidt et alia and entitled "VEHICLE DOOR MOUNTED DUAL MIRROR ASSEMBLY". Schmidt et al teaches a pair of vertically spaced apart mirrors mounted to a tubular support. The support has a mounting bracket affixed at the top and bottom ends thereof. Each mounting bracket comprises a base and a cover. The base section of the bracket is affixed to the door. The cover portion fits around the tubular support and fastens to the base. By this, the mirrors are set in a workable position and vibration is dampened.

Another example of mirror mounting bracket is found in U.S. Pat. No. 3,833,198 issued Sep. 3, 1974 to Holzman, entitled "VEHICLE MIRROR BRACKET ASSEMBLY". Holzman teaches a dual bracket assembly for securing a single mirror to a vehicle. The first bracket is L-shaped and joined to a door of a vehicle and at the base of a tubular support. The second bracket is U-shaped and joined to the door and to a tubular cross member. The cross member is joined to the tubular support, thus giving a firm basis for the member.

It has been found in the art that mirrors such as those identified herein are best used when only rarely in need of adjustment or movement. However, such mirrors are often bumped or otherwise moved, thus disrupting the view provided and having more difficult adjustment. Additionally, such mirrors require holes to be drilled into the vehicle in order to accommodate the mounting bracket. This can introduce rusting problems to a vehicle. Also, fasteners become loose and fall off. Thus, it is to be appreciated that what is needed is a single mirror mounting assembly for single mirrors or multiple mirror assemblies, which provides the requisite support, reduced maintenance, and eliminate the need for drilling holes in the vehicle. It is to these problems in the art that the present invention is directed.

SUMMARY OF THE INVENTION

The present invention provides a vehicular mirror mounting bracket which comprises:

(a) a first member comprising:
   (i) a mounting surface which abuts against and overlies a portion of the vehicle about the winged window of a door;
   (ii) an upper surface having a clamping portion for seating a mirror support rod;
   (iii) a first side wall;
   (iv) an opposed curvilinear second side wall having a first radius of curvature;

(b) a second member integrally formed with the first member comprising:
   (i) a clamping portion hingedly connected to the clamping portion of the first member and cooperating to envelop a mirror support rod therebetween;
   (ii) a second portion integral with the clamping portion having a curvilinear surface facing the curvilinear wall of the first member and having a second radius of curvature different from the first radius to enable application of a continuous torque to a mirror support rod and disposed between the portions;
   (iii) a third portion integral with the second portion and extending therefrom, the third portion having a mounting surface coplanar with the mounting surface of the first member and which abuts against and overlies a portion of the vehicle about the winged window of a door; and (c) means for securing the mounting surfaces to the vehicle.

The mounting bracket of the present invention is designed to be mounted with a dual mirror assembly at what is commonly referred to as the wing portion or wing window area of the front doors to the vehicle drivers cab. The mounting bracket is aerodynamic to reduce wind resistance because of the location for mounting. The reduced wind resistance lessens the possibility of the single bracket vibrating in the wind thereby reducing the vibration of the mirrors.

The mounting bracket is generally made from a light metal. The mounting bracket has a living hinge which permits the bracket to tighten around the tubular support for the mirrors. The living hinge is located proximate the point the first member and second member intersect and is an elongated "V" shaped slot formed at said intersection. The means for fastening the mounting bracket is used to secure the bracket to the vehicle. This causes the second member to tighten around the mirror support rod and holds the support rod in the desired position.

The present invention will be better understood with reference to the following detailed discussion and to the accompanying drawings in which like reference numerals refer to like elements and in which:

BRIEF DESCRIPTION OF THE DRAWINGS

FIG. 4 is an end view of the mounting bracket shown in an open condition;

FIG. 5 is an end view of the mounting bracket shown in a closed condition; and

FIG. 6 is a perspective view of the mounting bracket showing the bottom of the bracket showing the bottom of the bracket with a means for fastening.

DETAILED DESCRIPTION OF THE INVENTION

Figure 1:
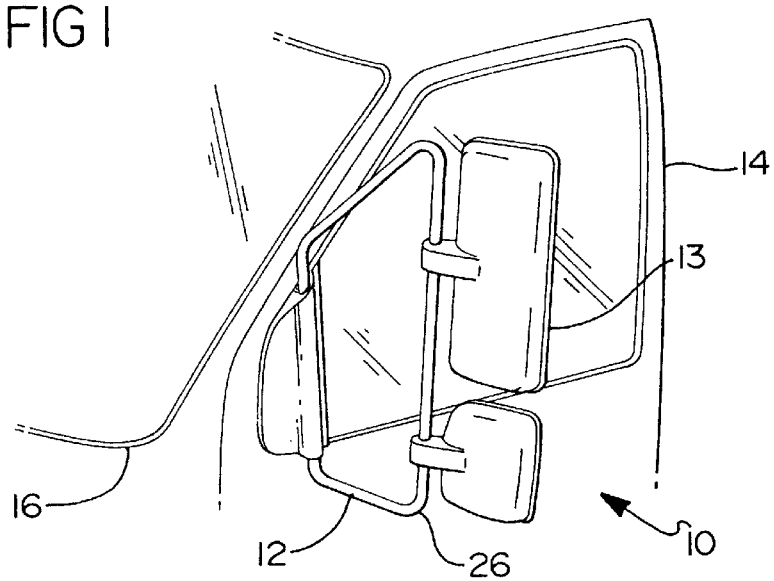
FIG. 1 is a perspective view of a dual mirror assembly of the present assembly mounted to a vehicle having a wing-type window.
Figure 2:
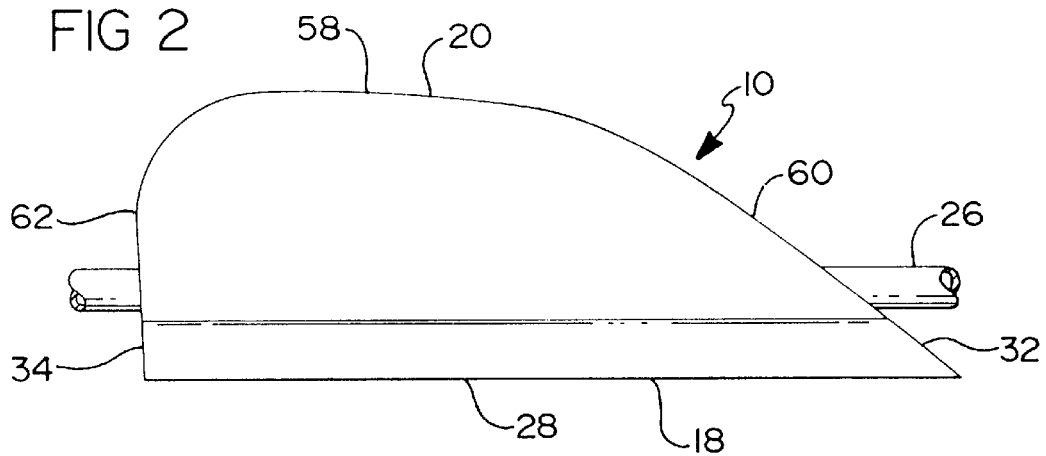
FIG. 2 is a plan view of the mounting bracket of the present assembly with a portion of a tubular support disposed therein.
Figure 3:
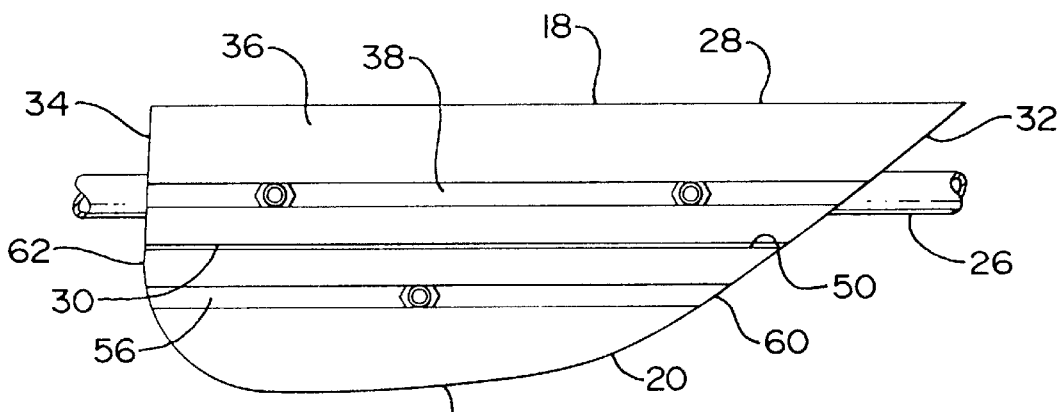
FIG. 3 is a bottom view of the mounting bracket with a portion of a tubular support shown therein.

Now with reference to the drawings, FIGS. 1–6, there is depicted therein a mirror moutning bracket in accordance with the present invention, generally designated as 10, for mounting a mirror assembly 12 to the wing portion of the door 14 of a vehicle 16. The mounting bracket 10 comprises a first member 18, a second member 20 and means 24 for securing the mounting bracket 10 to the door 14. The mounting bracket 10 attaches to the wing portion or wing window area of the door 14 of the vehicle and holds the mirror assembly 12, as shown.

The mounting bracket 10 clamps a mirror support rod 26 used to support the mirrors 13 of the mirror assembly 12. Also, the mounting bracket 10 is designed to be aerodynamic and conform to the shape of the wing or wing window portion of the door 14 of the vehicle 16.

The first member 18 of the mounting bracket 10 has a first side wall 28 and an opposed curvilinear second side wall 30, an upper wall 32 and a lower wall 34. The upper wall 32 of the first member 18 extends at an angle, preferably acute, from the first side wall 28 to the second side wall 30. The second side wall 30 is essentially parallel with the first side wall 28 and extends from the upper end 32 to the lower end 34. The lower end 34 is substantially normal to the first side wall 28 and the second side wall 30.

The first member 18 also has a mounting surface 36. The mounting surface 36 abuts against and mounts over a portion of the wing portion of the door 14 and which is described in greater detail below. The first mounting surface 36, preferably, has an elongated first slot 38 formed therein for use with the means 24 for securing the mounting bracket 10 to the door 14. The first slot 38 is preferably a "T" slot 38a, but may be any shape which serves to facilitate securing the mounting bracket 10 to the door 14.

Further, and as shown in FIGS. 4 and 5, the first member 18 has an upper surface 40 opposite the mounting surface 36. While the first mounting surface 36 is substantially flat, the upper surface 40 has a clamping portion 40a with a seat 42 formed therein to accommodate the support rod 26 for the mirror assembly 12. The seat 42 accommodates the support 26 at assembly.

As shown in FIGS. 2–5, the second member 20 cooperates with the first member 22 to provide a mounting surface for the mounting bracket 10, as shown in FIGS. 2–5. The second member 20 is integral with the first member 18.

The second member 20 comprises a clamping portion 48 which is hingedly connected to the clamping portion 40a of the first member 18. The clamping portion 48 of the second member 20 cooperates with the clamping portion 40a of the first member 18 to envelop a mirror support rod 26 therebetween. The second member 20 also has a second portion 48 integral with the clamping portion 46. The second member has a curvilinear surface 50 facing the curvilinear wall 30 of the first member 18. The curvilinear surface 50 has a second radius of curvature different from the first radius of curvature of the curvilinear wall 30. This difference enables the clamping portion 48 to apply continuous torque to the mirror support rod 26 which is disposed between the first member 18 and the second member 20.

Additionally, the second member has a third portion 52 integral and extending from the second portion 48. The third portion 52 has a mounting surface 54 which is coplanar with the mounting surface 36 of the first member 18. This mounting surface 54 also abuts against and mounts over a portion of the wing portion of the window of the door. Thus, the two mounting surfaces 36, 54 cooperate to cover the wing window portion.

As shown in FIG. 6, the mounting surface 54 preferably has a second elongated slot 56 formed therein. The second elongated slot 56 is substantially parallel with the first elongated slot 38. The second slot 56 is preferably a "T-shaped" slot 56a, but may be any shaped slot that will facilitate the attaching of the mounting bracket 10 to the door 14 of the vehicle 16. The first slot 38 and the second slot 56 cooperate with the means 24 for securing the bracket 10 to the door 14 of the vehicle 16.

The second member 20 is also preferably shaped to accommodate a traditional shape of a wing window portion of the door 14 of the vehicle 16. The second member 20 has a fourth side wall 58 opposite the curvilinear surface 50 and an upper wall 60 and a lower wall 62. The upper wall 60 extends at an angle, preferably acute and in a coplanar relationship with the upper wall of 32 of the first member 18, from the clamping portion 48 and merges with the fourth side wall 58. The fourth side wall 58 is substantially parallel with the first side wall 28 until it merges with the lower wall 62.

As shown in FIGS. 4 and 5, the clamping portion 46 is hingedly attached to the first member 18. The clamping portion 46 is, preferably, a radially curved portion with an outside surface 64 and an inside surface 66. The outside surface 64 is preferably a convex shape, but may be of any shape. Preferably, the inside surface 66 of the clamping portion 46 is substantially a cylindrical concave surface 66a, but may be shaped to accommodate any shape of mirror support rod 26 such as oval, square, etc. The seat 42 of the first member 18 and the concave surface 66a cooperate to form a bore 68 for receiving and holding the support rod 26 of the mirror 16.

The mounting bracket 10 has an open position and a closed position. In the open position, the mirror support rod 26 is easily loaded into the mounting bracket 10. In the closed position, the mounting bracket 10 clamps the support rod 26. To this end, the mounting bracket has a living hinge 70 which facilitates the opening and closing of the bracket 10. The living hinge 70 is defined by a "V"-shaped slot 72 formed at the intersection of the second member 20 and the first member 18.

The means 24 for securing the mounting bracket 10 to the door 14 of the vehicle 16 is preferably comprised of a single mounting plate 76 and at least two fasteners 74, but may be any number of plates 76, such as two, three, etc. The mounting plate 76 is an elongated plate 76 generally conforming to the shape of the mounting bracket 10. The mounting plate 76 has at least two apertures 76a formed therein to accommodate the fasteners 74. The mounting plate 76 is positioned on the inside of the door 14 over fasteners 74 protruding from the mounting bracket 10. Positioned between the mounting plate 76 and the mounting bracket 10 is the door 14 or window frame, which will be described in detail below. The fasteners 74 are preferably T-bolts 78 and their corresponding nuts 80, but may be any commercially available fastener 74 that will accomplish the same purpose.

An alternative means 24 for securing the mounting bracket 10 to the door 14 of the vehicle 16 may comprise a mounting plate 76 and a means for attaching the bracket 10 and plate together such as welding. Another alternative means 24 for securing the mounting bracket 10 to the door may be an adhesive. An adhesive is applied to the bracket 10 and the bracket 10 is assembled to the door 14. The adhesive is commercially available.

In use the support rod 26 for the mirror assembly 12 is fitted into the bore 68 of the mounting bracket 10 when the bracket 10 is in the open position. The mounting bracket 10 is then closed to secure the support rod 26. The mounting bracket 10 and support rod 26 are placed in position over the wing window opening on the outside of the door 14 of the vehicle 16 with the T-bolts 78 extending from the T-slots 38a, 56a of the mounting bracket 10. The mounting plate 76 is positioned over the wing window opening on the inside of the door 14 of the vehicle 16 such that the T-bolts 78 extending from the mounting bracket 10 are aligned with cooperating apertures 76a formed in the mounting plate 76. When the T-bolts 78 are extended through the mounting plate 76, threaded nuts 80 are placed on the T-bolts 78 and the bracket 10 and plate 76 are sufficiently tightened to the door 14 to hold the bracket 10 in position and still permit adjustment of the support rod 26. The mirrors are mounted to the support rod 26. The support rod 26 and the mirrors are adjusted to the driver's desired position and then the mounting bracket 10 is tightened in place. The mounting bracket 10 and the mounting plate 76 are preferably made from aluminum, but may be made from other metals or plastic.

The invention, as previously described, is a mirror mounting bracket 10 that provides a device for mounting large or dual mirror assemblies to the door 14 of a vehicle 16. The bracket 10 permits the mounting of the mirror assemblies without damaging the door 14 by drilling holes or having to provide for large mounting devices.

Having, thus, described the invention, what is claimed is:

1. A vehicular mirror mounting bracket for deployment over a wing window opening, the bracket comprising:
   (a) a first member comprising:
      (1) a mounting surface which abuts against and overlies a portion of the vehicle about the winged window opening of a door;
      (2) an upper surface having a clamping portion for seating a mirror support rod;
      (3) a first side wall; and
      (4) an opposed curvilinear second side wall having a first radius of curvature;
   (b) a second member integrally formed with the first member comprising:
      (1) a clamping portion hingedly connected to the clamping portion of the first member cooperating to envelop a mirror support rod therebetween;
      (2) a second portion integral with the clamping portion having a curvilinear surface facing the curvilinear wall of the first member and having a second radius of curvature different from the first radius to enable application of a continuous torque to the mirror support rod disposed between the clamping portion of the first member and the clamping portion of the second member; and
      (3) a third portion integral with the second portion and extending therefrom, the third portion having a mounting surface coplanar with the mounting surface of the first member and which abuts against and overlies a portion of the vehicle about the winged window opening of a door; and
   (c) means for securing the mounting surfaces to the vehicle.

2. The bracket of claim 1, wherein the means for securing comprises:
   at least one mounting plate releasably connectable to the first member and the second member.

3. The bracket of claim 2, wherein the first member has a first slot formed therein and the second member has a second slot formed therein, each slot receiving a fastener therein.

4. The bracket of claim 3, further comprising a plurality of fasteners deployed within the slots of the first member and the second member for fastening the bracket over the wing window opening.

5. The bracket of claim 4, further comprising:
   the at least one mounting plate having a plurality of apertures formed therein for receiving the fasteners, the at least one mounting plate, the base member and the fasteners comprising the means for securing the bracket over the wing window opening.

6. The bracket of claim 1, wherein the first member has a substantially arcuate surface formed therein proximate the hinge, and the second member has a substantially arcuate surface formed proximate to the hinge, the first member and the second member cooperating to define a substantially cylindrical area for receiving a mirror support therein.

7. The mounting bracket of claim 1 wherein the hinge comprises a living hinge.

8. A mirror apparatus for mounting over a wing window comprising:
   (a) at least one mirror;
   (b) a support rod to which the at least one mirror is attached;
   (c) a bracket comprising:
      (1) a base member having:
         (i) a first portion having at least one substantially arcuate surface and a T-channel formed therein;
         (ii) a second portion having at least one substantially arcuate surface and a T-channel formed therein;
         (iii) a hinge joining the first portion and the second portion; the first portion and second portion defining a bore between the arcuate surfaces, the support rod being deployed therein;
      (2) a mounting plate; and
   (d) means for joining the base member and the mounting plate.

9. The bracket of claim 8, wherein the means for joining comprises:
   a plurality of fasteners, at least one fastener being deployed in the T-channel of the first portion and at least one fastener deployed in the T-channel of the second portion, the mounting plate having a plurality of apertures formed therein for receiving the fasteners.

10. A mirror mounting assembly for mounting a support rod on a vehicle carrying at least one mirror over a wing window opening, the vehicle having a passenger compartment, the assembly comprising:
   (a) a clamping member having a first portion and a second portion connected by a living hinge, the first portion and the second portion cooperating to define a bore therein, the bore for receiving the support rod;
   (b) a mounting plate being larger in area than the wing window, the plate being mounted inside the passenger compartment proximate the wing window opening; and
   (c) means for fastening the clamping member to the mounting plate.

* * * * *